United States Patent
Skov

(10) Patent No.: US 6,602,458 B1
(45) Date of Patent: Aug. 5, 2003

(54) REDUCED FLASH MOLDING

(75) Inventor: Erik L. Skov, Akron, OH (US)

(73) Assignee: Rubbermaid Incorporated, Wooster, OH (US)

( * ) Notice: Subject to any disclaimer, the term of this patent is extended or adjusted under 35 U.S.C. 154(b) by 322 days.

(21) Appl. No.: 09/607,315

(22) Filed: Jun. 28, 2000

(51) Int. Cl.⁷ .............................................. B29C 49/04
(52) U.S. Cl. ........................ 264/536; 264/540; 425/532
(58) Field of Search ................................ 264/536, 540; 425/532

(56) References Cited

U.S. PATENT DOCUMENTS

| 3,050,773 | A | * | 8/1962 | Hagen ............................ 215/10 |
| 3,768,944 | A | | 10/1973 | Ninneman |
| 4,510,116 | A | | 4/1985 | Peters et al. |
| 4,521,177 | A | | 6/1985 | Blank et al. |
| 4,650,627 | A | | 3/1987 | Peters |
| 4,761,130 | A | | 8/1988 | Peters |
| 4,895,743 | A | | 1/1990 | Peters |
| 4,948,356 | A | | 8/1990 | Dundas et al. |
| 5,037,289 | A | * | 8/1991 | Ohta et al. ..................... 264/514 |
| 5,496,166 | A | | 3/1996 | Vogel et al. |
| 5,543,107 | A | * | 8/1996 | Malik et al. ................... 264/529 |
| 5,662,842 | A | | 9/1997 | Sadr et al. |
| 5,720,918 | A | | 2/1998 | Wollschlager et al. |
| 5,863,489 | A | | 1/1999 | Flood et al. |
| 6,033,204 | A | | 3/2000 | Iwawaki et al. |

* cited by examiner

Primary Examiner—Suzanne E. McDowell
(74) Attorney, Agent, or Firm—Marshall, Gerstein & Borun

(57) ABSTRACT

A reduced flash molding process and apparatus useful for a variety of parts, especially flat plastic panels, reduces trimming time, regrind waste, increases production speeds, reduces energy consumption, and reduces part weight. The reduction in flash is made possible by providing side members which close before molding material reaches them. Flash still occurs at the ends of the mold, but is eliminated from the sides. Because the parison can be more carefully managed during molding, the mold can be placed closer to the parison extrusion die, thereby reducing parison swell and sag and permitting more accurate filling of all areas within the mold geometry.

7 Claims, 10 Drawing Sheets

REDUCED FLASH MOLDING

CROSS-REFERENCE TO RELATED APPLICATIONS, IF ANY

None

BACKGROUND OF THE INVENTION

1. Field of the Invention

The present invention relates generally to the art of molding articles and more particularly to the elimination of flash during molding. In its most preferred embodiment, the present invention relates to a molding process and apparatus for flat panels which reduces flash by employing movable side plates which close prior to complete parison formation, blowing and mold closure.

2. Description of the Prior Art

Blow molding of plastic parts, such as flat panels used in outdoor sheds, tops for coolers and numerous other products has been accomplished by employing a mold which includes two mold halves. In one traditional molding process, a parison, or tube of hot plastic material is extruded downwardly between the mold halves. As the mold begins to close, the bottom of the parison is pinched closed to allow the plastic material to be blown to fill the mold cavity. In traditional molds the parison exceeds the dimensions of the mold at the time of final mold closure creating flash. Once heat is removed from the plastic, such as by the use of cooling water flowing through the mold halves, the part is removed, trimmed and further processed for its end use application.

While this blow molding process has been successfully used for many years, trimming is time consuming, labor intensive and therefore expensive. Moreover, a trim line is created around the part which may not yield a desirable appearance. In addition, a greater amount of material must be processed than would be necessary if the flash could be eliminated. Since the material itself is made by heating a plastic starting material to a molten condition, energy is wasted for that portion of the molded product which must be trimmed away. In addition, the part weight is typically higher using traditional molding than would be necessary if the flash were not produced, and the cycle time for a complete molding operation is high. Furthermore, the flash removal process can be relatively dangerous, and the elimination of the manual step of cutting plastic from a part could reduce lost time injuries, workers' compensation claims and the like. The development of a reduced flash molding process which is adaptable to a wide variety of articles, including flat panels, would represent a significant advance in this art.

FEATURES AND SUMMARY OF THE INVENTION

The present invention features a reduced flash molding process and apparatus which eliminates at least a part of the post molding trimming operation by addressing the source of the flash in the mold.

Another feature of the present invention is a reduced flash molding process and apparatus which eliminates excess flash along at least the sides of the molded article, reducing production cost and cycle time.

A different feature of the present invention is to provide a reduced flash molding process and apparatus which allows a part to be made using less material, thereby reducing part weight and reducing energy costs.

A still further feature of the present invention is to provide a reduced flash molding process and apparatus in which overall cycle time is reduced.

A still further feature of the present invention is to provide a reduced flash molding process and apparatus in which the mold can be placed closer to the plastic extrusion die, yielding greater control during parison formation and handling during the molding operation.

Yet another feature of the present invention is to provide a reduced flash molding process and apparatus which may be used for molding techniques other than blow molding of plastic parts, e.g. in glass molding, vacuum forming and the like.

How the foregoing features of the invention are accomplished individually, and in various combinations, will be described in detail in the following description of the preferred embodiment, taken in conjunction with the drawings. Generally, however, the reduced flash molding process and apparatus of the present invention includes the use of members at the sides of the mold which are closed before or while a parison is extruded (when using blow molding), following which the mold closes around the parison. While the mold closes, the parison is blocked by the side members which prevents any of the molding material from extending outside of the mold where the side members are located, and flash is formed only at the top and the bottom of the mold. Following formation of the part, trimming of only the top and bottom is required. Certain features are also provided by placing the extrusion die nearer the mold to improve parison management. As the parison begins to be extruded from the die, and since the extrusion gap is relatively small, parison swell can be enhanced to ensure better material distribution. As parison shooting progresses, the die gap itself is increased to give the parison sufficient strength to hold its own weight, and when the parison is fully extruded, the diameter at the die itself is smaller than the diameter at the bottom. Following prepinching, which can be done closer to the mold using the present invention, the parison is enlarged, such as by blowing air into it, so that the parison extends to and contacts the side members, which in turn prevent any material escape and allow a more uniform pre-blow inflation. The reduced flash molding process and apparatus of the present invention also permit the use of less material due to parison control at the top of the mold. Other ways in which the features of the invention may be individually or collectively accomplished will become apparent to those skilled in the art after they have read this specification. Such other ways are deemed to fall within the scope of the present invention if they fall within the scope of the claims which follow.

DETAILED DESCRIPTION OF THE DRAWINGS

In the following FIGURES, like reference numerals are used to indicate like components, and FIG. 1 is a schematic, perspective illustration of a reduced flash molding system with the mold in the open or preclose position;

DETAILED DESCRIPTION OF THE PREFERRED EMBODIMENT

Figure 1:
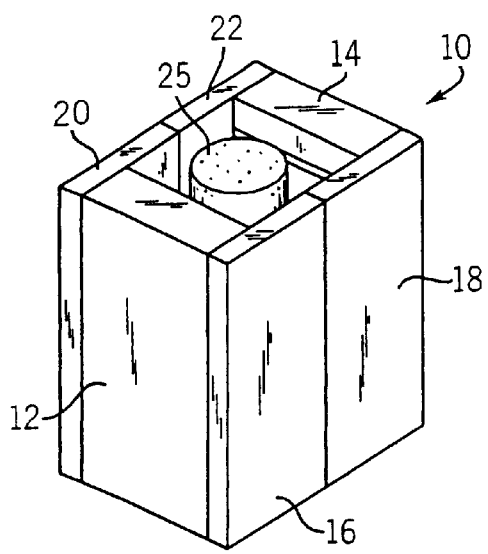
FIG. 1A is schematic, perspective illustration of a traditional molding system with the mold in the open or preclose position.

Before beginning the detailed description of the preferred embodiment, several general comments can be made about the applicability and the scope of the present invention. First, while the illustrations deal with the blow molding of flat panels, such as the types of panels used to make cooler chest tops or wall panels for modular outdoor storage sheds and the like, the principles of the invention have wide applicability with regard to the overall dimensions, shapes and types of products which can be advantageously produced using the new reduced flash system. Accordingly, the invention is not to be limited to flat panels (such as the ones illustrated or otherwise), and the invention has applicability to other types of molding than blow molding where the elimination of flash is desirable. The invention could be readily adapted to glass molding or vacuum forming processes, for example.

Second, schematic illustrations are used for most of the FIGURES, it being well within the ordinary skill of one familiar with the plastic molding art to construct extrusion dies, prepinching and mold manipulation systems for the desired final product. Cylinders are typically used for movement of the side members, and such cylinders may be hydraulic or pneumatic. Alternatively, they can be replaced by other systems, such as gears and the like, for moving the side members into and out of position as required. Moreover, while all the illustrations show a vertical parison shot into a space having vertical side walls and an open top and bottom, the process could be used with inclined molds and side members which have open ends.

Third, the particular rectangular product shown in the illustrations, and the use of two pairs of side members is again for purposes of illustration, rather than limitation, and other configurations of molded products will benefit from the use of a single or more than two pairs of side members for the elimination of flash. The principles of the present invention could be readily adapted by those skilled in this art, once a basic understanding of its principles has been achieved by reading the present specification and reviewing the drawings provided herewith.

Fourth, the illustrations show the side members being fully extended before mold closure begins, but this is not required, as long as full extension (closure) occurs before the parison reaches the location in the mold where the side members reside. In other words, mold closure can be initiated while the side members are being extended toward one another. In addition, a single side member could be used to define the space, rather than a side member comprising two plates having contact faces, and the side member(s) could be separately supported or could be attached to mold components and move therewith.

Fifth, the illustrated prepinch mechanism and location can be variously embodied. For example, it could be located above the mold to seal the parison at the beginning of the parison shoot, while other techniques have a prepinch device mounted directly to the bottom of the mold and can be separately energized or be part of the mold itself. The present method of this invention is readily adaptable to all such techniques, as well as systems where no separate prepinch is used at all.

Sixth, while a round parison is shown in the FIGURES, non-round parison extension dies can be used, e.g. oval or square.

Seventh, while top shooting of the parison is shown in the FIGURES, shooting from the bottom and pulling of the parison in an upward direction may also be used within the scope of the invention.

Proceeding now to a description of the preferred embodiment, FIG. 1 illustrates in schematic fashion the reduced flash molding system 10 according to the present invention. Reduced flash molding system 10 includes first and second mold halves 12 and 14, a first pair of side members 16, 18 and a second pair of side members 20, 22. In FIG. 1, the mold halves 12 and 14 are spaced apart from one another and a generally cylindrically shaped parison 25 is shown schematically located therebetween.

Figure 1A:
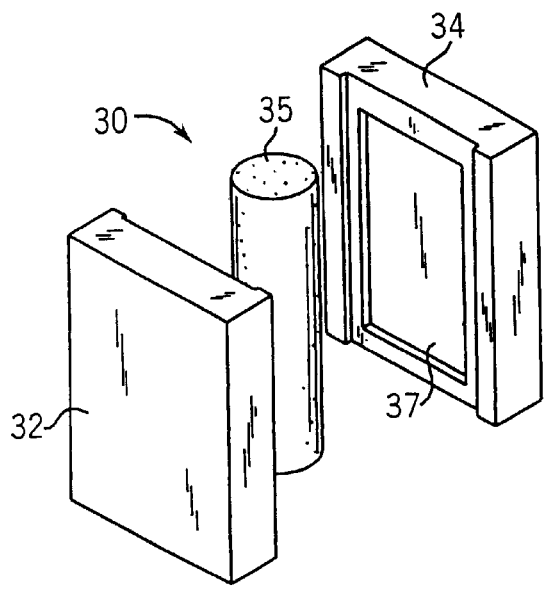

FIG. 1A shows a traditional molding system 30 including first and second mold halves 32, 34 and a parison 35 located therebetween. In the illustration of FIG. 1A, a mold recess 37 is shown in mold half 34, a compatible recess is located in mold half 32, but it is not visible in this illustration. In this case, the folded part to be prepared is a generally rectangular, flat panel.

Figure 2:
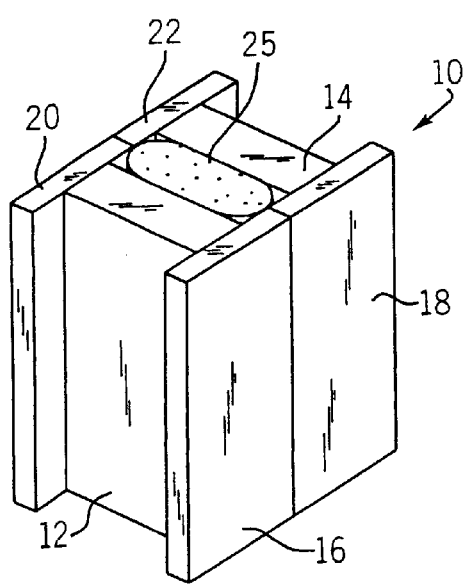
FIG. 2 is a schematic, perspective illustration of the reduced flash molding system shown in FIG. 1, with the mold partially closed.

FIG. 2 shows the reduced flash molding system 10 at a stage where mold halves 12 and 14 have started to approach one another, squeezing the parison 25 so that portions thereof contact, but do not penetrate the joint between the respective pairs of side elements 16, 18 and 20, 22.

Figure 2A:
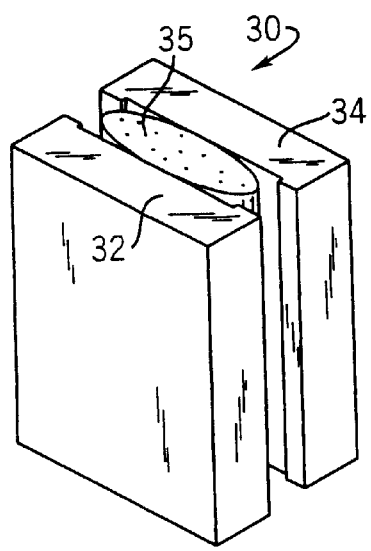
FIG. 2A is a schematic, perspective illustration of the traditional molding system shown in FIG. 1A, with the mold partially closed.

FIG. 2A shows a similar configuration for the traditional molding system 30, with parison 35 being squeezed into a generally oval configuration.

Figure 3:
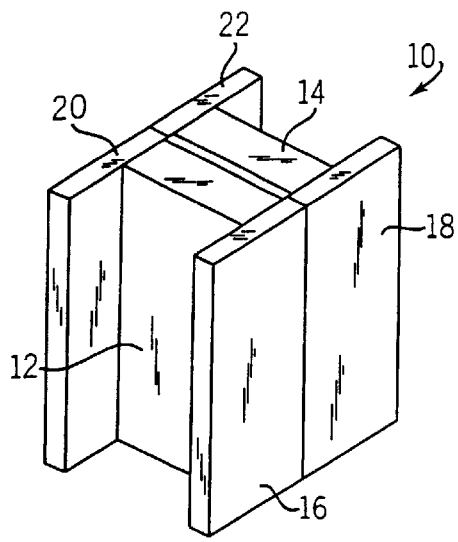
FIG. 3 is a schematic, perspective illustration of the reduced flash molding system shown in FIG. 1 with the mold closed.
Figure 3A:
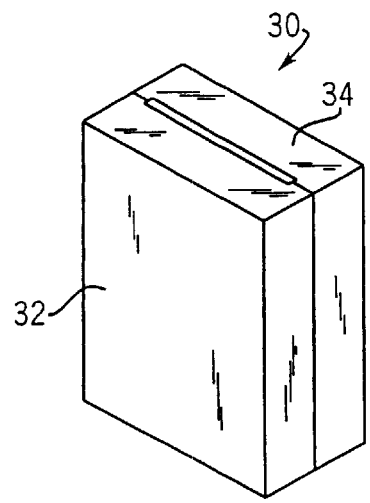
FIG. 3A is a schematic, perspective illustration of the traditional molding system shown in FIG. 1A, with the mold closed.

FIG. 3 differs from FIGS. 1 and 2 in that the mold halves 12 and 14 are closed. Similarly, and by comparison, FIG. 3A illustrates the traditional molding system 30 with the two mold halves 32, 34 closed.

Figure 4:
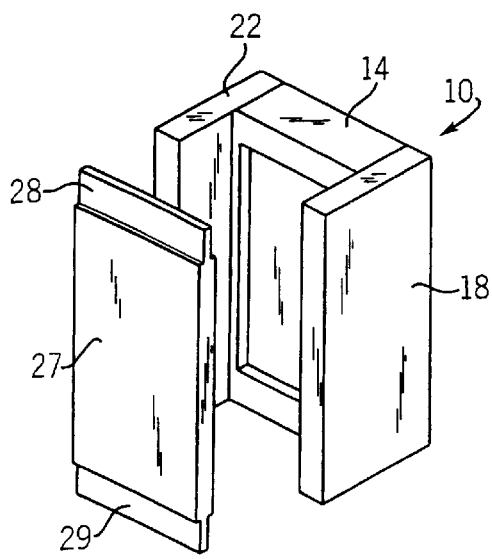
FIG. 4 is a schematic, perspective illustration showing a portion of the molding system shown in FIG. 1 and a molded part.
Figure 4A:
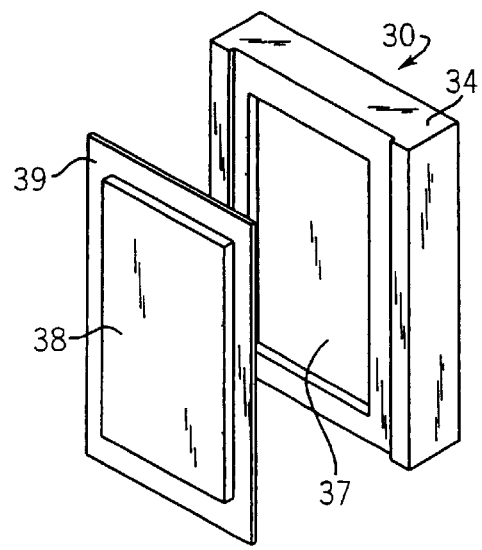
FIG. 4A is a schematic, perspective illustration of a portion of the traditional molding system shown in FIG. 1A and a molded part.

Some of the most significant differences in the reduced flash molding system 10 compared to the traditional molding system 30 are illustrated in FIGS. 4 and 4A. In FIG. 4, the forward mold half 12 is not shown and a molded part 27 is shown adjacent the remaining components. Part 27 includes flash 28, 29 at the top and bottom respectively of part 27. In contrast, a part 38 is shown in FIG. 4A totally surrounded by flash 39. From this very simplified description, it will be readily appreciated that the amount of flash which must be removed, as well as the amount of time it will take to remove it, is substantially greater using the traditional molding system 30. Moreover, a flash trim line will be present on all edges of part 38, but will only be present at the top and bottom of part 27.

Figure 5A:
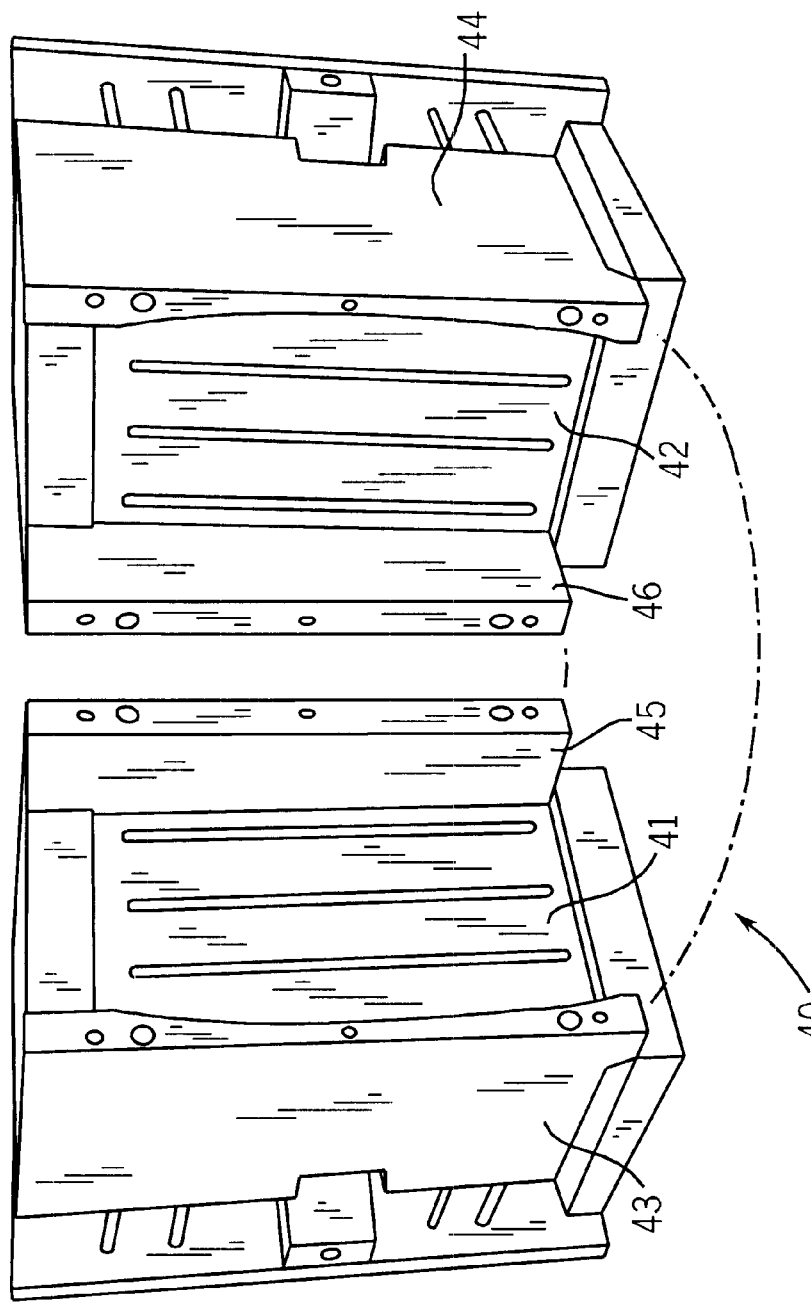
FIG. 5A is a perspective view of the two major components for a mold for a flat panel employing movable side members.
Figure 5B:
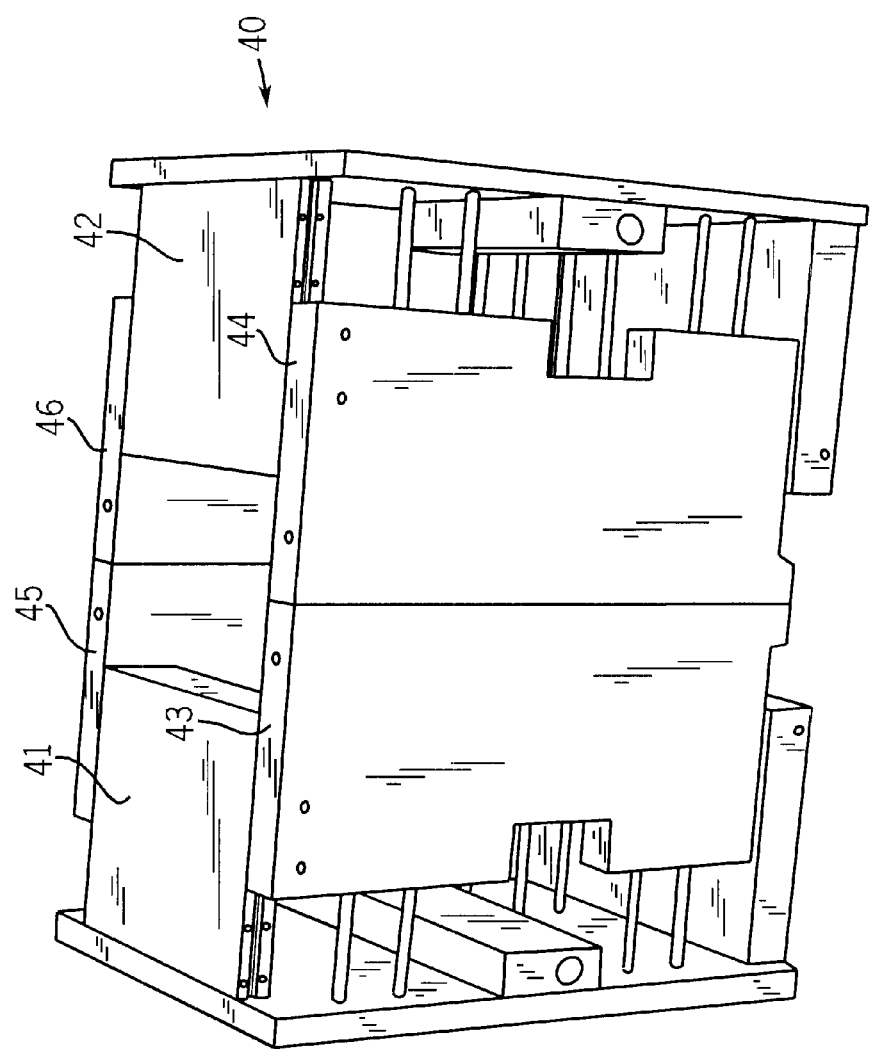
FIG. 5B is a side view of the components of FIG. 5A located together with the side members touching and the mold halves spaced apart.

FIGS. 5A and 5B illustrate how the various parts of a reduced flash molding system 40, according to the present invention, may be constructed. In particular, FIGS. 5A and 5B shows the mold halves 41 and 42 and side members 43, 44 and 45, 46. The mold and side member closure components are not included for purposes of simplifying the drawings. FIG. 5B shows the two components of FIG. 5A together as they would appear before parison shooting.

Figure 6:
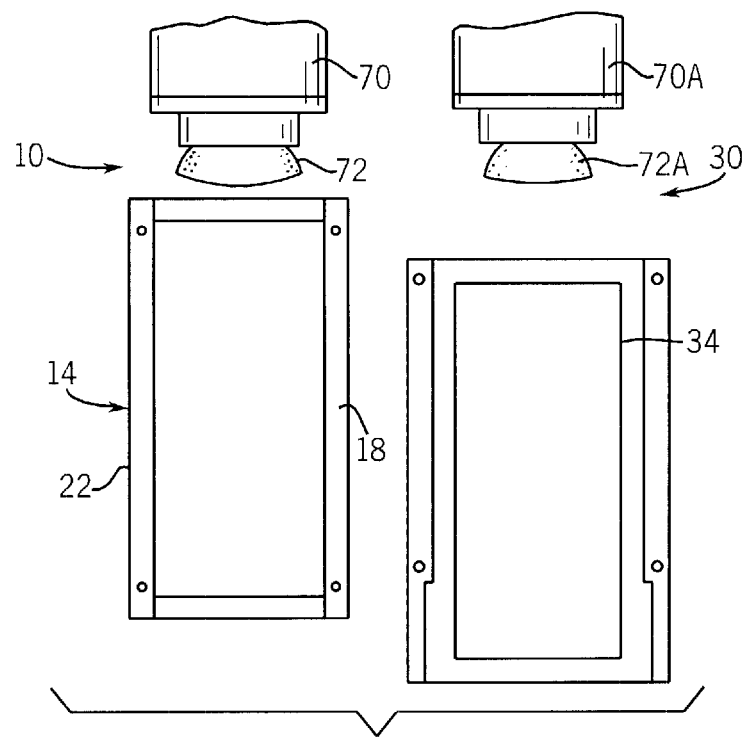
FIG. 6 is a side-by-side schematic comparison illustrating the beginning of a molding operation using the reduced flash system of the present invention and a traditional molding system.

FIG. 6 is a side schematic illustration showing, side-by-side, the reduced flash molding system 10 of the present invention and the traditional molding system 30. In the process shown in FIGS. 6–11 the moving side members 18 and 22 are used, but only the ends thereof are shown. Only the mold halves 14 and 34 are shown in these FIGURES. In addition, the extrusion dies 70 and 70A are included. It can be noted from FIG. 6 that die 70 is located closer to mold half 14 than die 70A is to mold half 34. As will become apparent from the description of this and subsequent FIGURES, the location can be closer because of the ability to more closely manage the parison during shooting and mold closure. The parison formation begins at the stage illustrated in FIG. 6, the parisons being illustrated at 72 and 72A. At this stage in the molding sequence, the die gaps of the extrusion dies 70 and 70A are quite small causing the greatest possible amount of parison swell.

Figure 7:
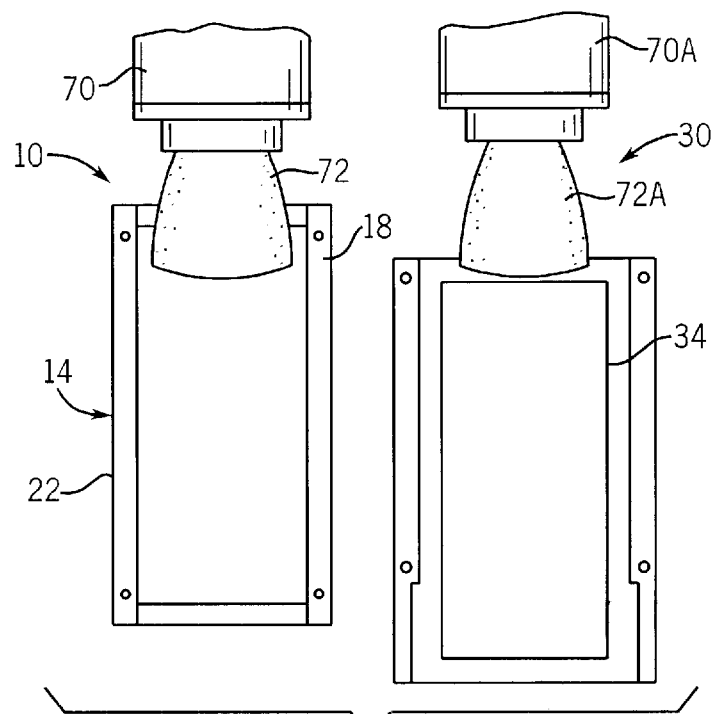
FIG. 7 is a side-by-side schematic comparison of the reduced flash molding system of the present invention and a traditional molding system, with the parison shoot in progress.

As parison shooting continues, and as illustrated in FIG. 7, the weight of the molten plastic will cause a sag of the parison to begin, causing a phenomenon known as "neck down". The neck down overcomes the swell, and decreases the overall diameter of the parison. To offset this effect, it is conventional practice to increase the die gap to give the parison enough material strength to be able to support its own weight. The increase in the die gap also reduces parison swelling at this stage.

Figure 8:
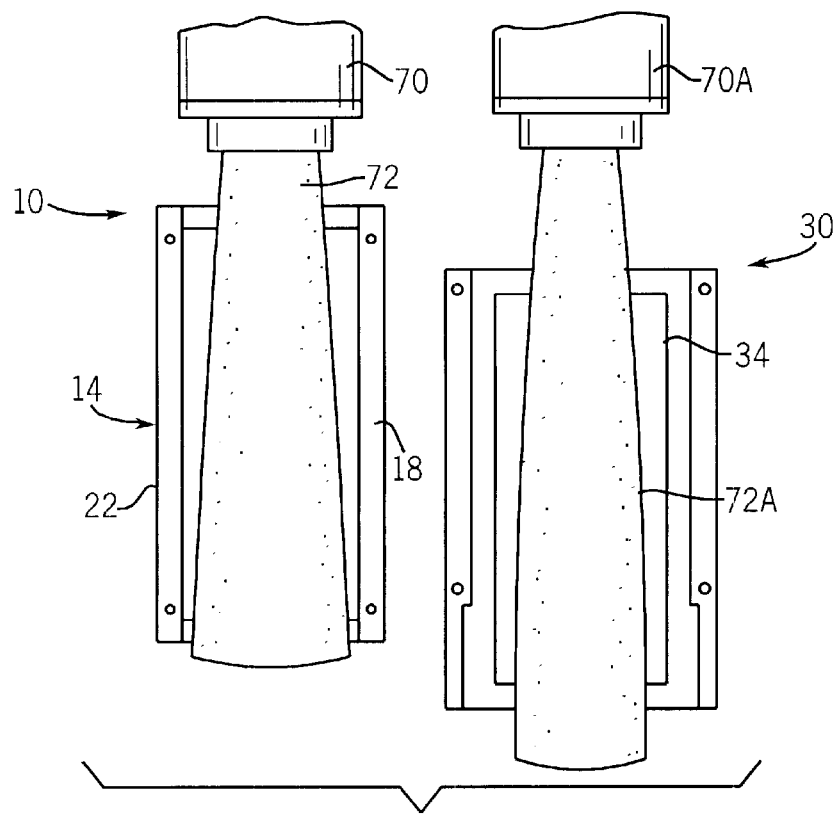
FIG. 8 is a side-by-side schematic comparison of the reduced flash molding system of the present invention and a traditional molding system, with the parison shown after it has reached the required length.

As parison formation continues, and as illustrated in FIG. 8, by the time the parison reaches the required length the diameter of the parison at the die is substantially smaller at the top than it is at the bottom. In both the reduced flash process of the present invention and in traditional molding, the parison formation is continued until the lower portion of the parison extends below the bottom of the mold.

Figure 9:
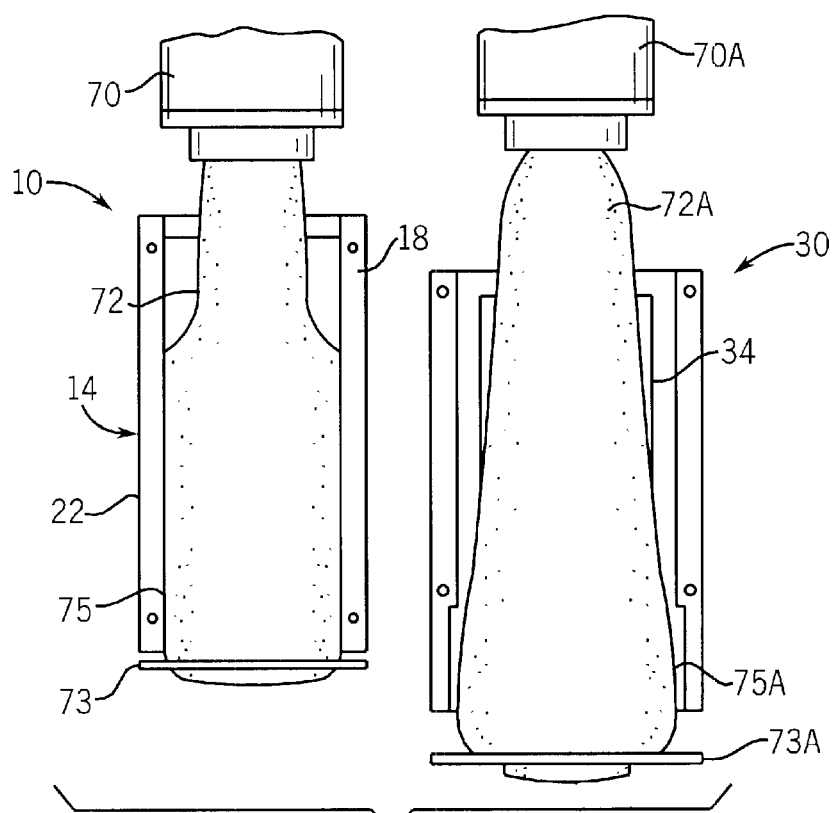
FIG. 9 is a side-by-side schematic comparison of the reduced flash molding system of the present invention and a traditional molding system, at a prepinch stage.

The prepinch processing step is illustrated in FIG. 9. Its purpose is to seal the bottom of the parison to allow the now closed system to be expanded by introducing air thereto. After prepinch to seal the parison and pre-blow inflation, the parison begins to fill the mold cavity. Initially, the pre-blow will enlarge the lower portion of the parison, causing it to exceed the cavity dimensions in a traditional mold as is shown at area 75A. With the reduced flash molding process 10 of the present invention, the side members will stop the parison from inflating past the cavity side, as is illustrated by the straight line 75 in this FIGURE. Accordingly, a more uniform pre-blow inflation is made possible, using less pre-blow air. The prepinch mechanism is schematically illustrated at 73 and 73A. These devices, in and of themselves, are conventional in the blow molding art and do not form part of the present invention. They may be simple plates moved between open and closed positions by pneumatic or hydraulic cylinders or other mechanisms.

Figure 10:
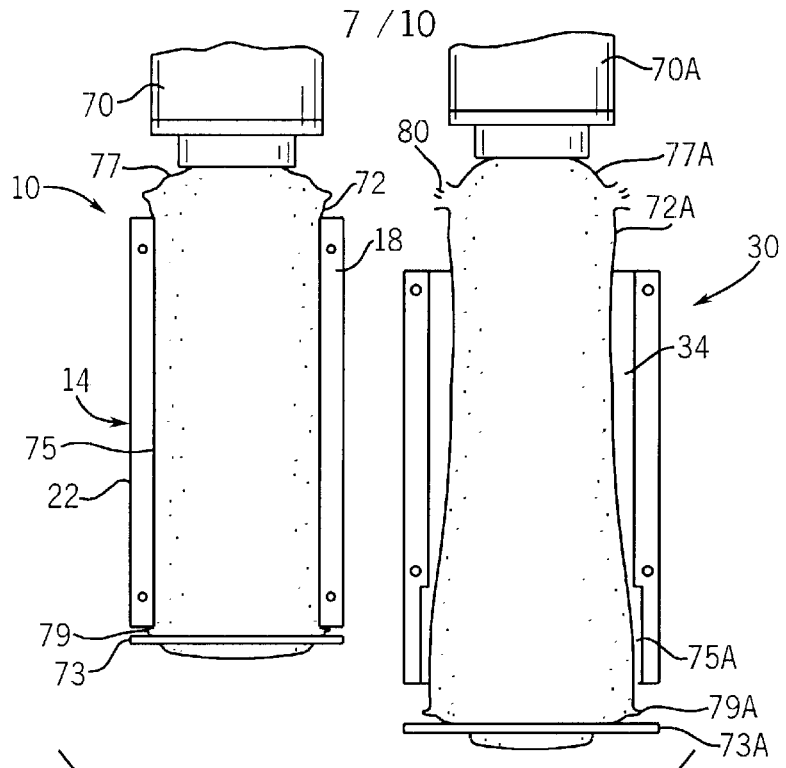
FIG. 10 is a side-by-side schematic comparison of the reduced flash molding system of the present invention and a traditional molding system, with final mold closure and parison rupture.

By the time the mold closes further, and as illustrated in FIG. 10, ballooning of the parison occurs at it contacts the mold. The ballooning will cause an excess enlargement above and below the mold as illustrated at 77 and 77A (at the top) and 79 and 79A (at the bottom). Eventually, when the mold is closed or very nearly closed, the enlargements will rupture (see reference number 80), and deflation of the parison balloon will occur. Complete mold closure and inflation of the parison within the mold must take place before the deflation and collapse of the parison occurs. It will be noted in FIG. 10 that the parison has completely filled the reduced flash mold along its sides from the top to the bottom, while mold filling is more irregular using the traditional molding process.

Figure 11:
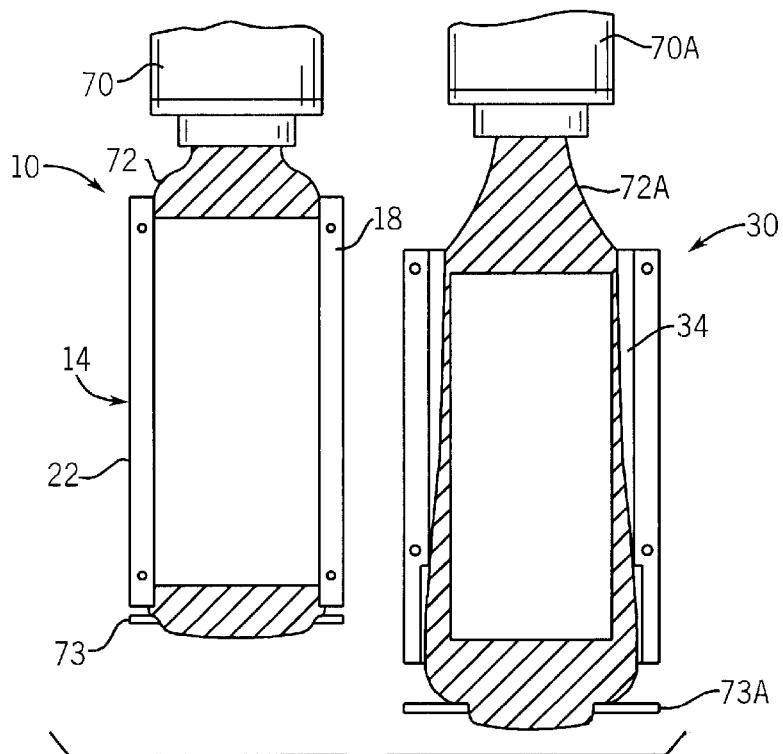
FIG. 11 is a side-by-side schematic comparison of the reduced flash molding system of the present invention and a traditional molding system, with the flash illustrated after the molding of a part has been completed.

Finally, the results of the molding operation are observed in the schematic of FIG. 11. It will be noted first that the amount of flash resulting from a traditional mold system 30 is shown on the right side of this FIGURE, with diagonal lining. The flash occurs around the entire molded article, requiring a substantial amount of trimming and labor to create the desired rectangular flat panel. On the other hand, with the reduced flash molding system 10 of the present invention, flash exists only at the top and the bottom, and no converting operations such as trimming are required elsewhere.

These illustrations point out the importance of being able to control the distance from the die to the mold, which is typically determined by the amount of parison width required to fill the top geometry's of the mold. By managing the pre-blow inflation and using greater swell in the reduced flash molding system 10, less distance is required between the die and much more precise parison sizing for a particular molded article can be accomplished. It is also noted in the FIGURES that the prepinch mechanism 73 is located closer to the bottom of the mold than is possible using the traditional molding system 30.

Figure 12A:
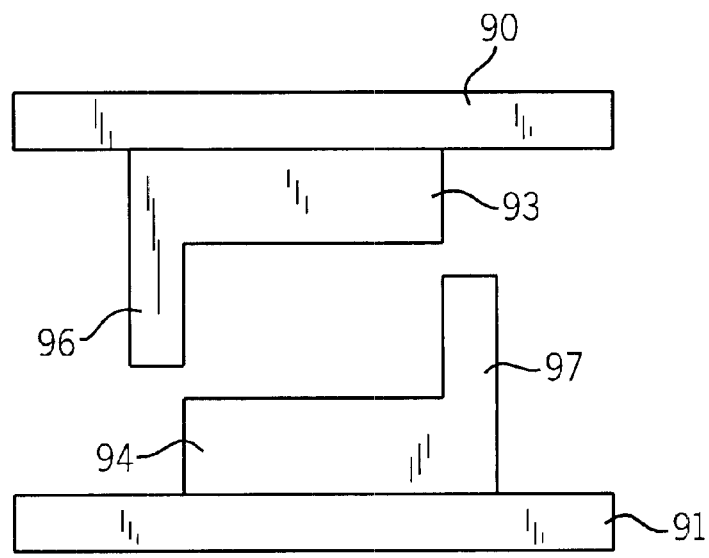
FIGS. 12A–12C are schematic top views of three stages of a molding operation wherein the side members are integral with the mold components.
Figure 12B:
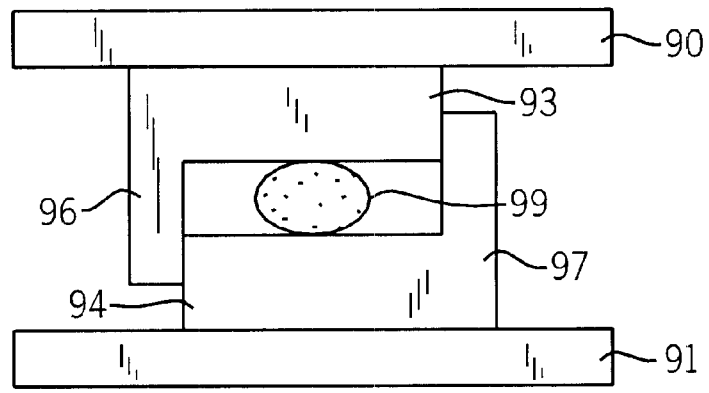
Figure 12C:
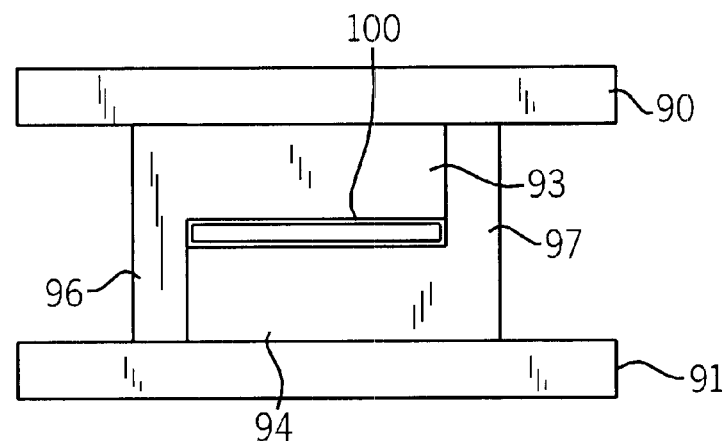

FIGS. 12A–12C illustrate, in a top view, an alternate embodiment wherein the side members are combined with the mold elements. In these FIGURES, 90 and 91 represent mold press platens, while two L-shaped molds are illustrated at 93, 94. Legs 96–97 of the molds 93, 94. Legs 96–97 of the molds 93, 94 act as the side members as best seen in FIG. 12B where the schematic parison 99 is also shown. FIGS. 12C shows the molded part 100. Another embodiment of the invention would include fixed side members which are paralleled to one another and spaced by a distance sufficient to accommodate the moving mold parts. If it were desirable to remove a molded part from the side, one or both of the side members could be mounted for pivotable rotation to facilitate the part removal step.

Figure 13A:
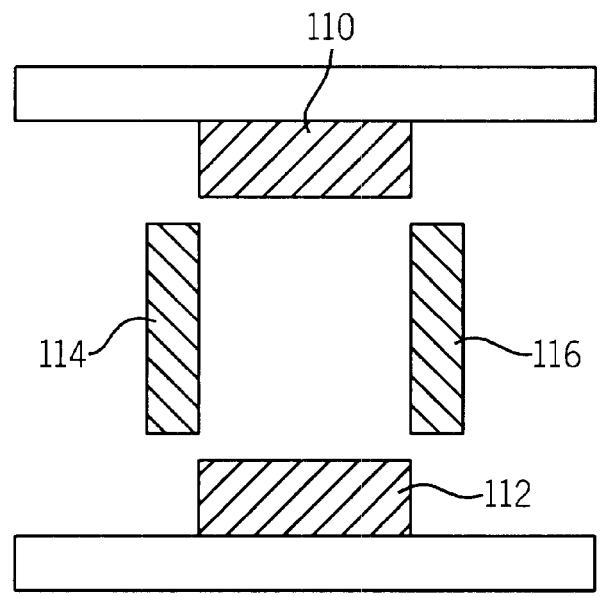
FIGS. 13A–13C are schematic top views showing the three stages of a molding operation wherein the side members are fixed.
Figure 13B:
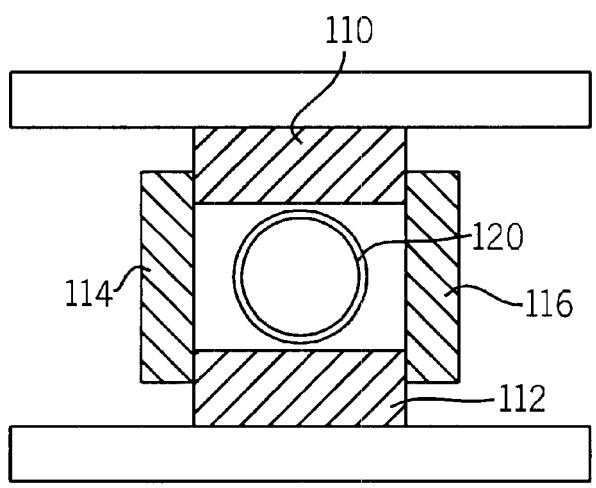
Figure 13C:
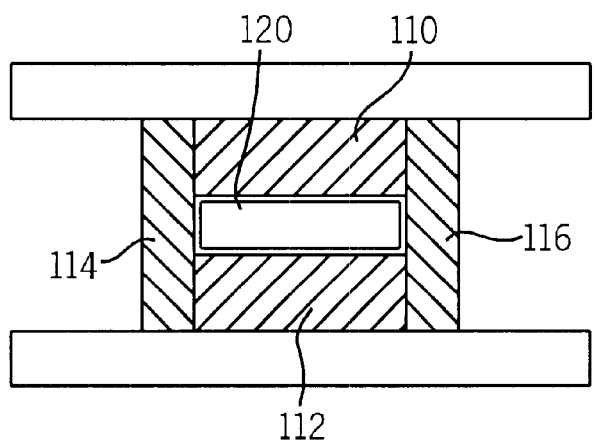
Figure 13D:
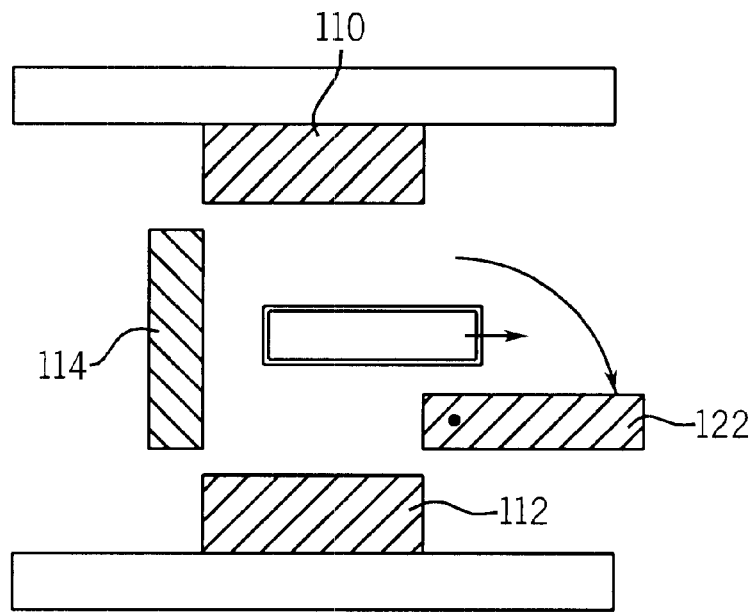
FIG. 13D is a schematic top view similar to FIGS. 13A–13C, except that one of the side members is pivotable.
Figure 13E:
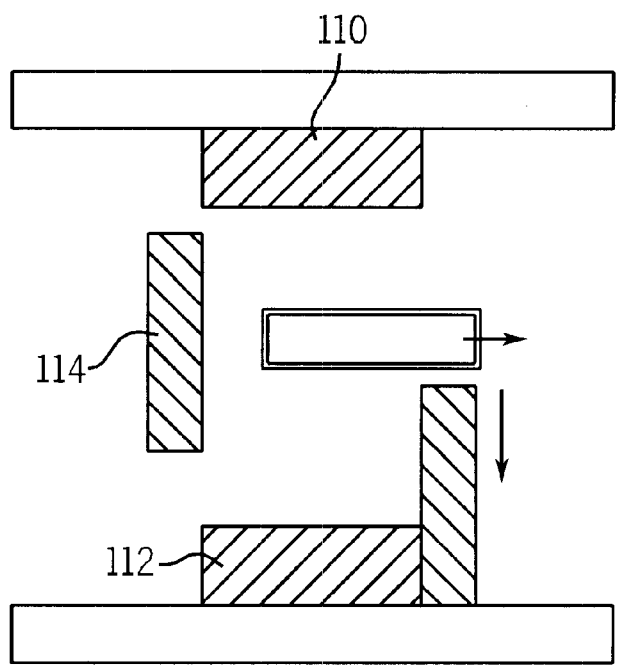
FIG. 13E is a schematic top view similar to FIGS. 13A–13C, except that one of the side members is slidable.

This embodiment is described in FIGS. 13A–13E which show in top schematic form a pair of moving mold components 110, 112. In FIGS. 13A–13C, the side members 114, 116 are fixed and the parison 120 is illustrated in FIGS. 13B and 13C. In FIG. 13D, side member 116 is replaced by a pivoting side member 122 to permit part removal, and in FIG. 13E, the side member 116 is replaced by a sliding side member 124 to also permit sideways part removal.

While the reduced flash molding process and apparatus of the present invention have been illustrated in schematic form from an overview standpoint and from the standpoint of parison management, those skilled in this art will readily appreciate how the reduced flash molding concept can be adapted to a wide variety of molded article shapes and to different molding techniques. Accordingly, the present invention is to be limited, not by the illustrations or description above, but solely by the scope of the claims which follow.

What is claimed is:

1. A molding process for the blow molding of a part comprising:
   providing at least two mold components for molding a part when the components are moved from an open to a closed position and a parison is located therebetween;
   providing at least one side member arranged in contacting engagement with at least one mold component when the components are in the closed position, thereby defining an edge of the part;
   placing the at least one side member in a molding position before the mold components are moved to their closed position to define a space having enclosed sides and first and second open ends;
   shooting a parison through the first open end; and
   blowing the parison and moving the mold components to their closed position to form the part without flash along any edge defined by a side member.

2. The process of claim 1 wherein each side member comprises a pair of side plates movable between retracted positions and a molding position in which an edge of each plate engages a mating edge of the other plate without a space therebetween.

3. The process of claim 1 wherein each side member is integral with a mold component.

4. The process of claim 1 wherein there are two opposed mold components and two opposed side members and the panel produced by the process includes flash only at the first and second ends of the panel and the process comprises the further step of trimming the flash from the panel.

5. The process of claim 1 wherein a die is used to form and shoot the parison and the die is located nearer the first open end than could be accomplished when using a comparable molding process without the side members.

6. The process of claim 1 wherein a prepinch mechanism is used to prepinch the parison before final mold closure and is located nearer the second open end than could be accomplished when using a comparable molding process without the side members.

7. A molding process for the production of flat, blow molded panels comprising the steps of:
   providing first and second vertical mold halves which when closed define a chamber for molding the panels and which may be opened and spaced apart from one another;
   providing vertical side members arranged in contacting engagement with at least one mold component when the components are in the closed position, thereby defining a side of the panel;
   wherein the vertical side members are movable between retracted and molding positions, and the mold halves and side members define a space having an open top and an open bottom when the side members are in their molding position and the mold halves are opened;
   shooting a parison of a molten thermoplastic resin from a die into the space while the vertical side members are in their molding position;
   moving the vertical mold halves to their closed position while expanding the parison to fill the chamber;
   cooling the molten resin within the mold; and
   moving the vertical mold halves to their open position, retracting the side members, and removing a molded panel having flash at the top and the bottom thereof and having no flash on those sides thereof defined by the vertical side members.

* * * * *